Nov. 23, 1965  C. R. STRUCK  3,218,866
FLUID SAMPLING DEVICE
Filed March 28, 1963  4 Sheets-Sheet 1
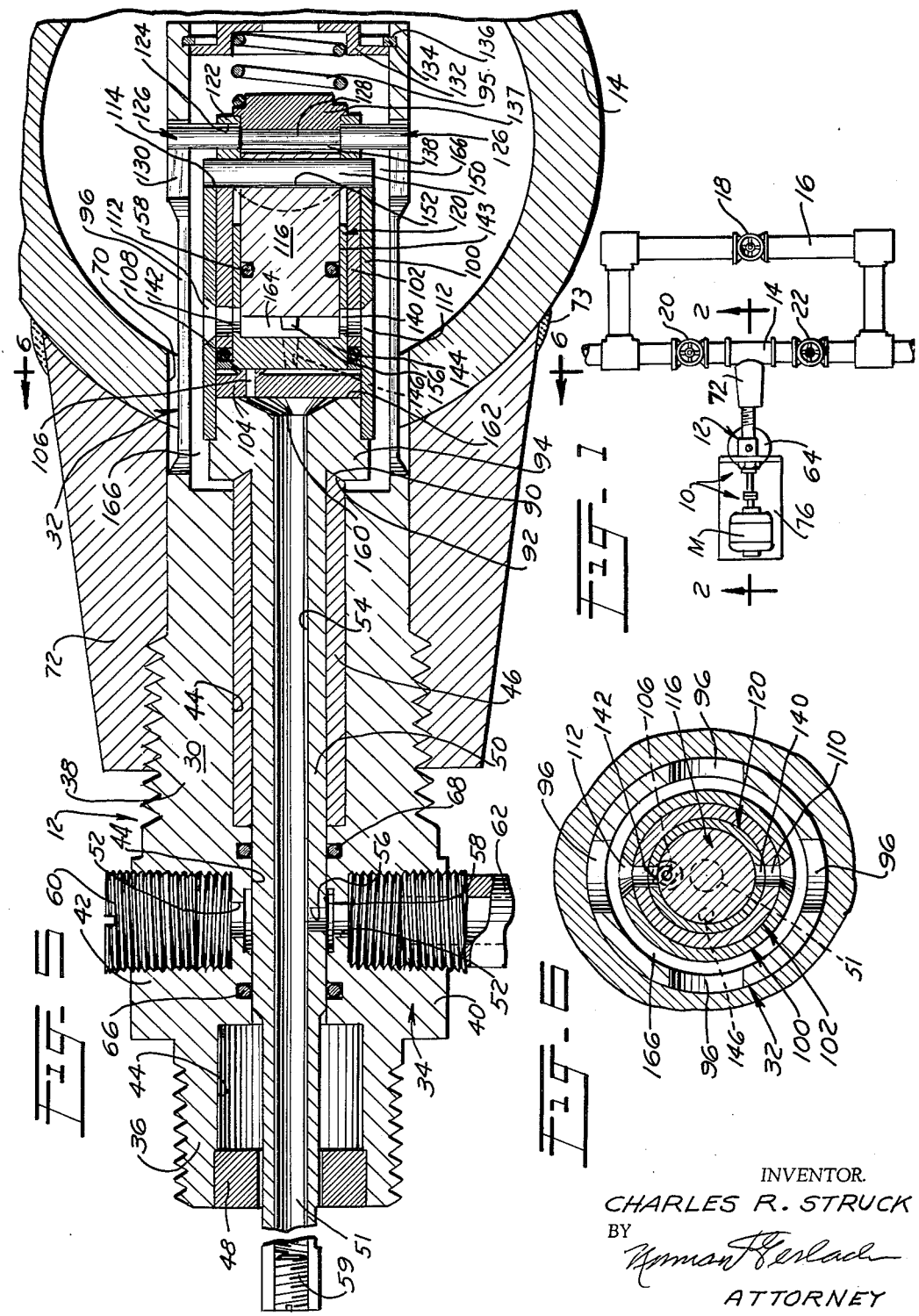
INVENTOR.
CHARLES R. STRUCK
BY Norman F. Gerlach
ATTORNEY

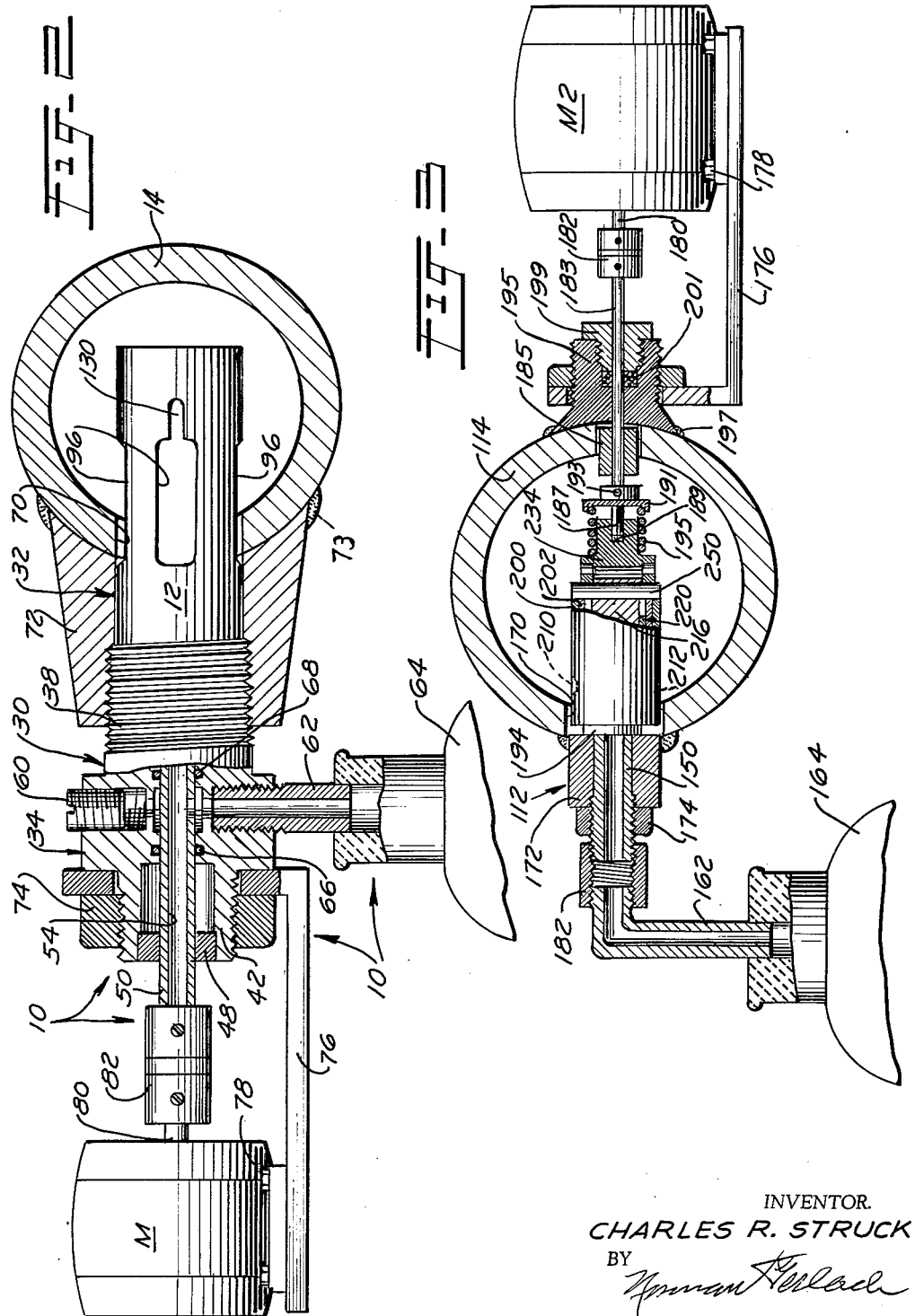

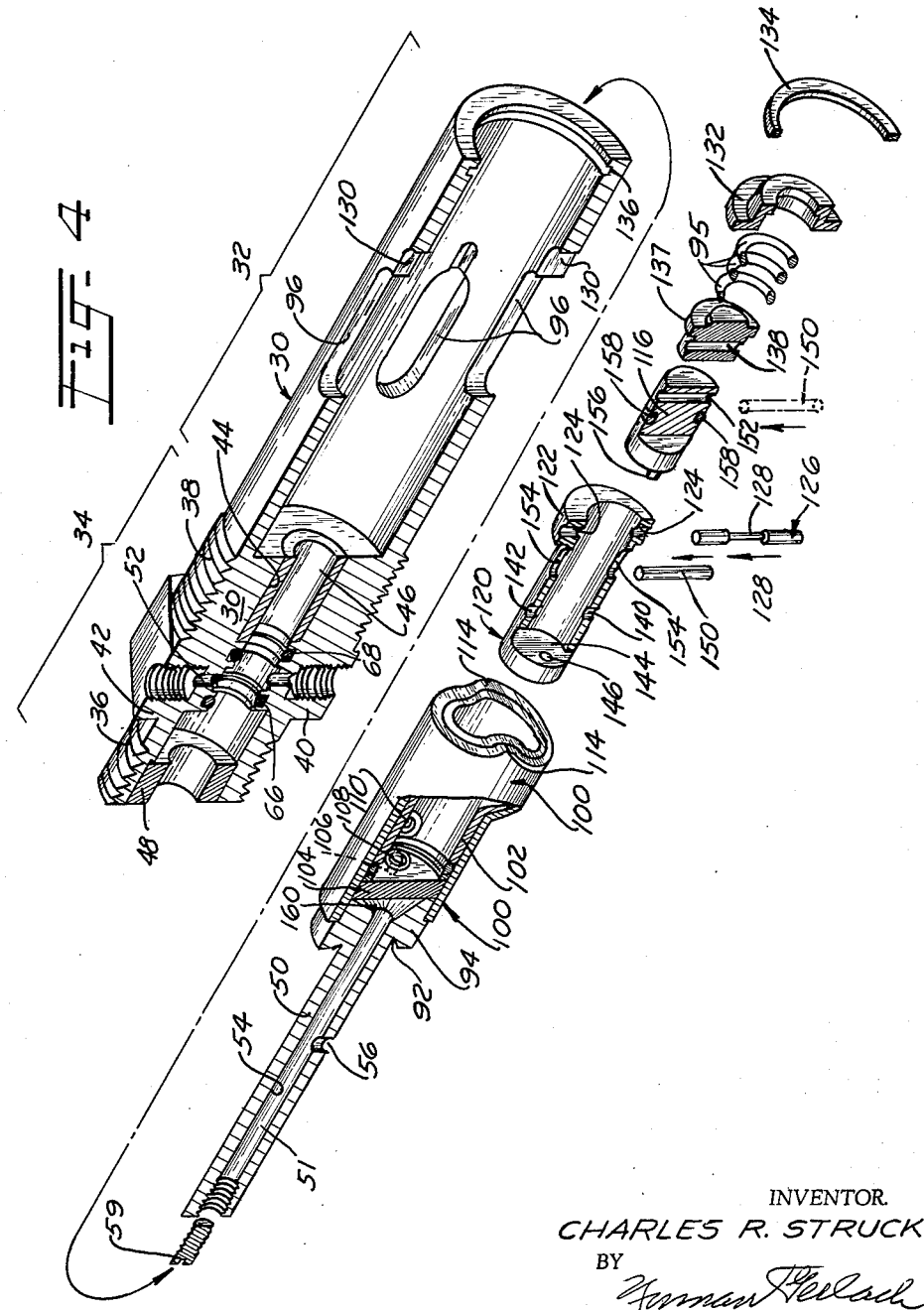

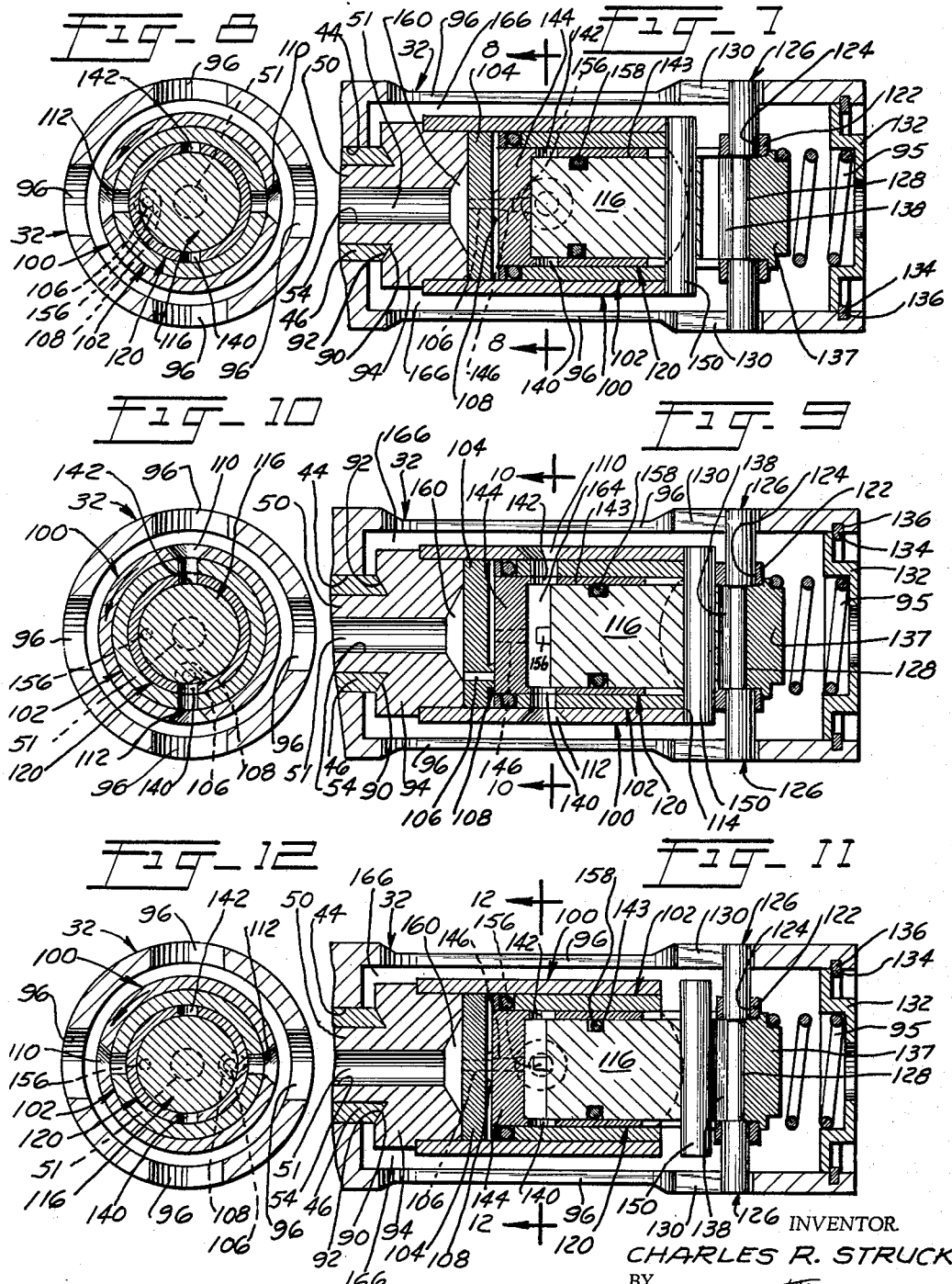

United States Patent Office 3,218,866
Patented Nov. 23, 1965

3,218,866
FLUID SAMPLING DEVICE
Charles R. Struck, Santa Barbara, Calif., assignor to True-Cut Products, Inc., Goleta, Calif., a corporation of California
Filed Mar. 28, 1963, Ser. No. 268,752
3 Claims. (Cl. 73—422)

The present invention relates generally to fluid sampling devices for separating small representative quantities or samples of a fluid from a flow line through which the fluid flows. The invention has particular reference to and is designed as an improvement on a fluid sampling device of the type which is illustrated and described in United States Patent No. 3,031,890, granted to me on May 1, 1962, and entitled "Fluid Sampling Device."

It is among the principal objects of the present invention to provide an improved fluid sampling device of the aforementioned type and in which there is embodied between the rotating parts of the device novel porting means by means of which measured quantities of fluid are passed through the device to a point of delivery, the porting means being of a simplified nature and resulting in a simplification in the manufacturing process which are involved in constructing the constituent parts of the device.

Another object of the invention is to provide, in a fluid sampling device of the type under consideration, a novel sealing means for certain of the fluid ports, such sealing means being effective when the ports are out of register to prevent short circuiting of the fluid between the ports to the end that as a consequence there will be no leakage fluid passing through the ports in either direction.

Still another object of the invention is to provide a fluid sampling device having associated therewith novel valve means whereby, after a given measured sample of fluid has been ejected from the device, the delivery port through which such fluid is ejected becomes effectively sealed so that leakage of fluid in excess of the delivered sample will not take place.

A further object of the invention is to provide a fluid sampling device which is cyclic in its operation and, at a certain point in the cycle, effects a reversal of fluid flow through certain of the ports for the purpose of eliminating clogging of these ports by any suspended material which may be present in the fluid.

Another object of the invention is to provide a fluid sampling device which has relatively rotatable parts and is effective regardless of the direction of relative rotation between such parts.

Still another object of the invention is to provide a fluid sampling device which, with a minimum amount of modification, is capable of use for delivering fluid samples at relatively low pressures or at relatively high pressures, as desired, the device in the latter instance taking on the aspects of a fluid injector mechanism.

Finally it is an object of the invention to provide a fluid sampling device having novel anti-friction bearing means between certain of the relatively rotatable parts, such bearing means resulting in a smoother, more silent and effective operation of the device as a whole.

With these and other objects and advantages in view, the invention consists of the novel construction, combination and arrangement of the various parts which are shown in the accompanying four sheets of drawings wherein two embodiments of the invention have been shown.

In these drawings:

FIG. 1 is a plan view of a fluid sampling device constructed according to the principles of the present invention, the device being shown operatively installed in a fluid sampling system;

FIG. 2 is an enlarged sectional view, partly in elevation, taken on the line 2—2 of FIG. 1;

FIG. 3 is a sectional view similar to FIG. 2 but showing a slightly modified form of fluid sampling device operatively installed in a pressure inject system;

FIG. 4 is an exploded perspective view showing the component parts of the fluid sampling device of FIGS. 1 and 2 and illustrating their positional relationship with respect to one another;

FIG. 5 is an enlarged sectional view taken vertically and centrally through a portion of the device of FIG. 2 and showing the various parts in the positions which they assume at the end of the third quarter of a fluid measuring cycle;

FIG. 6 is a sectional view taken on the line 6—6 of FIG. 5;

FIG. 7 is a sectional view similar to FIG. 5 but showing the various parts of the device in the positions they assume at the commencement of a fluid measuring cycle;

FIG. 8 is a sectional view taken on the line 8—8 of FIG. 7;

FIG. 9 is a sectional view similar to FIG. 5 but showing the parts of the fluid sampling device in the positions which they assume at the end of a quarter cycle of operation;

FIG. 10 is a sectional view taken on the line 10—10 of FIG. 9;

FIG. 11 is a sectional view similar to FIG. 5 but showing the parts of the device in the positions which they assume at the end of a half cycle of operation; and FIG. 12 is a sectional view taken on the line 12—12 of FIG. 11.

Referring now to the drawings in detail, the fluid sampling device of the present invention has been illustrated in FIGS. 1 and 2 as being associated with a dispensing apparatus. One express purpose of the device is to separate small measured representative quantities or samples of a fluid from a fluid flow line. In FIG. 3 the fluid sampling device, in a somewhat modified form, has been illustrated as being associated with an injection apparatus wherein small measured quantities of a fluid are injected under relatively high back pressure into a receptacle. In both illustrated forms of the invention, the essential features thereof are substantially the same.

In FIG. 1 the dispensing apparatus has been designated in its entirety by the reference numeral 10. The fluid sampling device of the present invention constitutes a component part of this apparatus and it is in the form of a self-contained, motor-driven, package-type dispensing unit 12, one end of which is adapted to be interposed in a fluid stream which passes through a fluid line. The latter includes a conduit 14 which receives the unit 12. Fluid is adapted to be by-passed around the unit 12 by way of a sectional branch conduit 16 having a manually controlled valve 18 interposed therein. A pair of shut-off valves 20 and 22 are disposed in the conduit 14 on opposite sides of the unit 12. When these two valves are closed and the valve 18 is opened, fluid will pass through the line and by-pass the unit 12. When the valves 20 and 22 are opened and the valve 18 is closed, fluid will pass through the conduit 14 for cooperation with the unit 12.

The device or unit 12 comprises a generally cylindrical outer casing 30 (see FIG. 4) which is preferably in the form of a casting and consists of a forward cage section 32 and a rear fitting section 34 as indicated by the brackets in FIG. 4. The rear fitting section 34 is in the form of a four-way fitting which presents or embodies four legs 36, 38, 40 and 42 (see FIG. 5) and has a longitudinally extending irregular bore 44. The latter passes axially through the legs 36 and 38 and communicates with the interior of the forward cage section 32. At its front end, the bore 44 is recessed or counterbored to receive an antifriction bushing 46 which preferably is made of polytetrafluorethylene polymer. Such polymer is sold by E. I. du Pont de Nemours & Company under the trade name "Teflon." At its rear end, the bore 44 is recessed or counterbored to receive a stabilizer bushing 48 which also may be formed of Teflon. An elongated delivery tube 50 passes through the bore 44 and is rotatably supported in the bushings 46 and 48. The extreme forward end of the tube 50 projects into cage section 32 of the unit 12. The delivery tube 50 embodies a coextensive fluid passage 51 which is defined by the inner surface 54 of the tube.

As best seen in FIG. 5, the four-way fitting section 34 of the unit 12 is provided with a transverse cross-bore 52 which is formed in and coaxial with the legs 40 and 42 and is adapted to communicate with the fluid passage 51 in the delivery tube 50 by way of a transverse port 56 in the delivery tube. The port 56 is at all times in communication with an annular recess 58 which is formed in the bore 44 and communicates with the cross-bore 52. The rear end of the fluid passage 51 is closed by a screw plug 59. The leg 42 of the section 34 receives therein a screw type sealing plug 60 while the interior of the leg 40 communicates through a delivery pipe 62 with the interior of a sample-receiving receptacle 64 (see FIGS. 1 and 2). The receiving end of the pipe 62 is connected to the leg 40 by screw threads. O-ring seals 66 and 68 are provided between the bore 44 and delivery tube 50 on opposite sides of the port 56 in the delivery tube 50.

The forward cage section 32 of the unit 12 projects through an opening 70 (see FIGS. 2 and 5) in the conduit 14 and the outer casing 30 of the unit 12 is fixedly held in position on the conduit 14 by means of an adaptor sleeve 72 which is welded at 73 to the conduit 14 and threadedly receives the leg 38 therein. A jamb nut 74 is threadedly received on the rear or free end of the leg 36 and serves fixedly to clamp a motor supporting bracket 76 in position on the unit 12. An electroc motor M is bolted or otherwise secured as at 78 to the bracket 76 and has its drive shaft 80 connected through a flexible coupling 82 to the delivery tube 50.

The extreme forward end of the antifriction bushing 46 is provided with an annular tapered end face 90 (see FIG. 5) which makes running sealing engagement with a cooperating tapered undercut face 92 on an enlarged hub portion 94, such hub portion being formed on and as an integral part of the forward end of the rotatable motor driven delivery tube 50. The two faces 90 and 92 are maintained in running sealing engagement with each other under the influence of a remotely disposed compresison spring 95 in a manner that will be made clear presently.

The forward cage section 32 of the unit 12 extends across the interior of the conduit 14 to a region adjacent to the remote wall portion thereof so that it is thus positioned in diametrical fashion directly in a fluid stream passing through the conduit. The cylindrical wall of the cage section 32 is provided with a series of four generally rectangular openings 96 therein, these openings being disposed circumferentially 90° apart and being provided for the purpose of exposing the interior of the cage section at all times to the free flow of fluid through the cage section in conformity with the flow of fluid along or through the conduit 14.

An outer cup member in the form of a tubular sleeve 100 has its rear end telescopically received over the hub 94 and this sleeve projects forwardly of the hub an appreciable distance. The sleeve is press-fitted or otherwise secured to the hub 94 for rotation in unison therewith. It is provided with a cylindrical anti-friction liner 102 which may be formed of a suitable plastic material, such for example Teflon, and is disposed within the sleeve 100 with a tight fit in order that it is rotatable in unison with the sleeve. A circular disc-like valve seat 104, which likewise may be formed of Teflon, is received within the sleeve 100 with a press-fit, the rear face of this valve seat bearing against the forward face of the hub 94. An eccentric valve port 106 extends through the valve seat 104 and the forward rim of this port is surrounded by an integral sealing lip or annulus 108. The sleeve 100 and its liner 102, considered collectively, are provided with a pair of diametrically opposed fluid ports 110 and 112 the purpose of which will become clear presently. The forward rim of the sleeve and liner when considered collectively, is provided with two cam protuberances 114 which are diametrically disposed across said rim and are in longitudinal register with the ports 110 and 112. As will be described in greater detail hereafter, these cam protuberances 114 are provided for the purpose of actuating a reciprocal fluid dispensing piston 116.

From the above description it will be seen that the delivery tube 50, the hub 94, the sleeve 100, the liner 102 and the valve seat 104 are all rotatable in unison. The liner 102 has slidably disposed therein a non-rotatable inner sample cup 120. The latter is of relatively deep cup-shaped design and the forward open end thereof is provided with a relatively thick integral rim flange 122 through which there extend two vertically disposed diametrically opposed holes 124 for reception therein of the ends of a transversely extending reaction torque pin 126 having a reduced medial portion 128. The extreme end regions of the reaction torque pin 126 project radially outwardly beyond the rim flange 122 of the cup 120 and are slidably received in two narrow slot-like extensions 130 which are associated with and extend forward from the front ends of the two vertically aligned openings 96 in the cage section 32 of the unit. The reaction torque pin 126 when in position serves to prevent rotation of the sample cup 120, the cage section 32 offering the necessary anti-torque reaction force for preventing such rotation. The sample cup 120 is normally urged rearwardly within the sleeve 100 and its liner 102 means of the previously mentioned compression spring 95. Such spring bears at its forward end against a centering cup 132 which in turn bears against a split snap ring 134. The latter is seated within an internal annular groove 136 in the front end of the cage section 32. The rear end of the spring 95 bears against a saddle member 137 which is bifurcated as at 138 so that it straddles the reduced medial portion 128 of the reaction torque pin 126. The spring 95 and the saddle member 137 serve normally to urge the pin 126 rearwardly so as, in turn, to urge the sample cup 120 rearwardly and cause the end face thereof sealingly to engage the sealing annulus 108 which surrounds the port 106 in the Teflon valve seat 104.

The sample cup 120 is provided with two diametrically opposite ports 140 and 142 which are respectively designed for alternate registry in passing with the ports 110 and 112 in the sleeve 100 and the liner 102. These ports 140 and 142 are formed in the cylindrical wall 143 of the sample cup. The end wall 144 of the sample cup 120 is provided with an eccentric port 146 for registry with the port 106 in the valve seat 104, such registry taking place once during each revolution of the rotatable parts including the valve seat 104.

The previously mentioned piston 116 is of cylindrical design and is slidable endwise within the sample cup 120 but is held against rotation within the cup by means of a vertically extending thrust pin 150 (see FIG. 5) which extends diametrically through a transverse bore 152 in the piston 116. The ends of the thrust pin are slidably disposed in vertically aligned longitudinally extending slots 154 in the cylindrical wall 143 of the cup 120. They project radially outwardly in trunnion-like fashion beyond the confines of the sample cup and are designed for sliding engagement on the forward rim of the sleeve 100 so that the thrust pin 150 may thus cooperate with the cam protuberances 114. The rear end face of the piston 116 is provided with a tapered plug valve 156 which is eccentrically disposed on the end face and is in longitudinal register with the port 146 so that when the piston 116 is in its rear position the plug valve 156 will enter the port 146 and effectively close the same. An O-ring 158 serves to seal the piston 116 with respect to the cylindrical wall 143 of the sample cup 120.

Before entering into a description of the operation of the unit 12 when employed for fluid sampling purposes as illustrated in FIGS. 1 and 2, it is deemed pertinent to point out that the port 106 is at all times in register with the fluid passage 51 in the delivery tube 50 by reason of a countersink type central well 160 (see FIG. 5) in the forward end face 162 of the enlarged hub portion 94 of the delivery tube, this well 160 encompassing the orbital path of movement of the port 106 as the delivery tube assembly including the sleeve 100 and the seat 104 rotates. It also is pointed out that, as best seen in FIGS. 4 and 6, the circumferential disposition of the ports 140, 142 and 146 in the sample cup 120 is such that the eccentric port 146 is displaced 90° from each of the ports 140 and 142, and that the ports 110 and 112 in the sleeve 100 and the port 106 in the valve seat 104 lie in a common plane extending through the axis of rotation of the delivery tube 50, this arrangement being effected so that when the piston 116 is in its forward position the entrapped fluid in the measuring chamber of space 164 which exists within the sample cup between the rear end face of the piston 116 and the end wall 144 of the sample cup 120 cannot escape until such time as the port 106 moves into register with the port 146 and the piston 116 is released for rearward fluid-ejection purposes all in a manner that will be described presently.

In the operation of the unit 12, when the same is employed in connection with the fluid sampling apparatus such as has been illustrated in FIGS. 1 and 2, the unit will be operatively installed in the conduit 14 from which the samples are to be taken and the valve 18 will be closed while the two valves 20 and 22 will be open. A substantially steady stream of fluid will then flow through the conduit 14 around and through the conduit enclosed portion of the cage section 32, the fluid entering through the four openings 96 and freely penetrating the interior of the cage section. Assuming the motor M to be energized, the delivery tube and sleeve assembly including the delivery tube 50, its hub 94, the seat 104, the sleeve 100 and the liner 102 will rotate in unison, while the cage section 32, the reaction torque pin 126, the sample cup 120, the piston 116 and the thrust pin 150 will be held against rotation. Assuming that at the commencement of each sampling cycle, the various parts assume the position wherein they are shown in FIG. 7, the rear end face of the piston 116 will bear against the end wall 144 of the sample cup 120 so that there will be no unoccupied space within the sample cup and all fluid will be excluded therefrom. The ports 110 and 112 in the sleeve 100 and its liner 102 will be out of register with the ports 140 and 142 in the cylindrical wall 143 of the sample cup 120. The tapered plug valve 156 will be disposed in the port 146 thus sealing the latter. The eccentric port 106 in the valve seat 104 will be in register with the port 146 by reason of the projecting ends of the thrust pin 150 resting upon a low region of the forward open rim of the sleeve 100 and remaining out of register with the two cam protuberances 114 (see FIG. 4) so that the piston 116 is fully retracted within the sample cup 120.

Upon continued rotation of the sleeve 100 in the direction indicated by the arrow in FIG. 8, the projecting ends of the thrust pin 150 will ride forwardly on the cam protuberances 114 thus causing the piston 116 to move forwardly and establish the space 164 (see FIG. 9) between the rear end face of the piston 116 and the end wall 144 of the sample cup 120, this space reaching maximum capacity at 90° in the cycle as shown in FIG. 9 when the cam projecting ends of the thrust pin 150 rest upon the crest of the protuberances 114. Upon continued rotation of the sleeve 100 in the direction indicated by the arrow in FIG. 8, the ports 106 and 146 will move out of register with each other and a progressively decreasing fluid pressure will be developed within the space 164 which is progressively established as the piston 116 moves forwardly. The sealing annulus 108 surrounding the port 106 bears sealingly against the rear end face of the seat valve 144 so that there can be no lateral drift of fluid from the now displaced port 106 back through the port 146.

At such time as the sleeve 100 has rotated through an angle of 90° in the direction indicated by the arrow in FIGS. 8 and 10 thus completing the first quarter cycle of the operation of the device, the port 110 in the sleeve and the liner will move into register with the port 142 in the sample cup 120, while the port 112 in the sleeve and the liner will move into register with the port 140 in the sample cup. At this time the capacity of the space 164 is at its measured maximum and the space will be in communication with the annular space 166 between the sleeve 100 and the cage section 32 so that the fluid which circulates freely in said annular space will enter the space 164 through the various registering ports. The space 164 will thus become filled with a measured quantity of the fluid. The port 106 will have moved away from the port 146 and the sealing annulus 108 will continue to effect its sealing function against the rear end face of the end wall 144 of the sample cup 120. Further rotation of the sleeve 120 from the position which it assumes at 90° in the cycle will cause the projecting ends of the thrust pin 150 to ride off of the cam protuberances 114 thus leaving the piston 116 free and subject to the fluid pressure which is exerted upon it at its exposed forward end. Such continued rotation of the rotatable parts of the unit 12 also causes the ports 110 and 112 to move out of register with the ports 142 and 140 so that the fluid which has filled the space 164 in the sample cup 120 becomes entrapped behind the piston 116. The port 146 in the end wall 144 of the sample cup 120 continues to be sealed against passage of fluid in either direction therethrough inasmuch as the sealing annulus 108 remains in sealing contact with the rear end face of said end wall. The static pressure which is exerted by the fluid on the piston 116 is balanced by the internal pressure of the entrapped fluid within the space 164 so that the piston 116 cannot, at this time, move rearwardly. This entrapment of the fluid within the space 164 remains in effect even when the sleeve 100 assumes the position wherein it is shown in FIGS. 11 and 12 and which represents the 180° point in the cycle. At this time the projecting ends of the thrust pin 150 are again in register with the protuberances 114 at the open front end of the sleeve 100 but these cam protuberances are without function inasmuch as the ports 146 and 106 are 180° apart and thus are out of register so that the static pressure of fluid holds the piston in its forward position. Thus, no change in function takes place at 180° in the cycle.

In FIGS. 5 and 6 the sleeve 100 and other associated rotating parts are shown in the positions which they assume at 270° in the cycle. At this point, the port 112 in the sleeve 100 and the liner 102 have moved into register with the port 142 in the cylindrical wall 143 of the sample cup 120, while the port 110 has moved into register with the port 140 in the cylindrical wall of the sample cup, this being a reversal of the ports 110 and 112 from the positions which they assumed at 90° in the cycle. The fluid in the space 164 is thus again opened to communication with the annular space 166 through these registering ports so that if for any reason the space 164 failed to take in its full quota of fluid at the 90° cycle point when these various ports were in reverse register, the space will now have an opportunity to draw in the remaining or necessary fluid in order completely to fill the same. In this regard, it should be explained that the unit 12 is not designed for high speed rotation and ordinarily the delivery tube 50 and its associated rotating parts will not be rotated at a speed in excess of 20 r.p.m. At relatively slow speeds of rotation there will be ample duration of registry between the ports 110, 112, 140 and 142 at approximately 90° in the cycle to allow for complete filling of the space 164. However, as the upper limit of the speed of rotation of the delivery tube 50 is approached, port cut-off may take place before sufficient time has elapsed to allow for complete filling of the space. Therefore at 270° in the cycle as represented in FIGS. 5 and 6, the condition of port registry illustrated in these views allows for further filling of the space 164 if necessary.

Continued rotation of the sleeve 100 beyond the 270° point in the cycle will cause the ports 112 and 110 in the sleeve 100 to move away from the ports 140 and 142 respectively. The sealing annulus 108 will remain in sealing contact with the end face of the end wall 144 of the sample cup 120 so that the fluid which initially becomes entrapped in the space 164 remains entrapped until such time as the eccentric port 106 in the valve seat 104 moves into register with the port 146 in the end wall 144 of the sample cup 120 at the end of the cycle (360° rotation). When this condition of port registry between the ports 106 and 146 takes place, the fluid in the space 164 is in communication with the fluid passage 51 in the delivery tube 50 so that fluid pressure on the rear face of the piston 116 is relieved and the piston moves rearwardly under the influence of fluid pressure on the front face thereof to expel the entrapped fluid from the sample cup into the fluid passage 51 from whence it passes radially outwardly through the port 56, the annular recess 58, and the bore 52 and into the receptacle 64.

The cyclic operation of the unit 12 as described above is repeated indefinitely, the unit discharging a measured sample of the fluid into the receptacle 64 once during each revolution of the delivery tube 50. It is of course apparent that the unit 12 is effective regardless of the direction of rotation of the delivery tube 50.

In FIG. 3 a slightly modified form of unit 112 has been illustrated for use in connection with relatively high pressure injection of measured quantities of fluid into a receptacle 164 from a conduit 114 in which the fluid flow is maintained under high pressure. While the unit 12 shown in FIG. 2 may, without modification, serve to effect such high pressure injection, it has been found that under certain circumstances the two O-rings on opposite sides of the final delivery pipe 62 in the four-way rear fitting section 34 will not withstand the high pressure. Accordingly, the injection system of FIG. 3 is preferable. In this form of the invention the final delivery pipe 162 leading to the receptacle 164 is directly connected to the delivery tube 150 by a rigid threaded coupling 182 and this delivery tube, together with its associated parts are maintained stationary while the sample cup and piston assembly are caused to be rotated. Since no reaction force is required for holding the sample cup and piston assembly against rotation the cage section 32 in the form of the invention shown in FIG. 2 has been eliminated. Otherwise the essential elements of the assembly which comprises the unit 112 remains substantially identical with the corresponding elements of the unit 12. Because of this similarity between the structures of FIGS. 2 and 3 and in order to avoid needless repetition of description, corresponding reference numerals but of a higher order have been applied to the various parts of FIG. 3 which have identical or substantially identical corresponding parts in FIG. 2.

A lock nut 174 is threadedly received on the delivery tube 150 and bears against the adaptor sleeve 172 thus serving fixedly to secure the delivery tube 150 against rotation. With the delivery tube 150 thus fixed, the sleeve 200 and its liner 202, as well as the valve seat and other associated parts which do not appear in FIG. 3, remain stationary. The sample cup 220 is adapted to be rotated under the influence of an electric motor M2 which operates through a coupling 182 to cause rotation of a drive shaft 183. The drive shaft 183 passes through a stabilizer sleeve 185 which is anchored in the wall of the conduit 114 and has its distal end squared as at 187 and received in a square socket 189 in the saddle member 234. A packing gland 196 for the shaft 183 is welded as at 197 to the conduit 114 and has associated the usual jamb nut 199 and packing material 201. The necessary reaction anchor for the spring 195 which forces the sample cup 220 against the valve seat (not shown) is afforded by means of a collar 191 which is anchored by a set screw 193 to the shaft 183. It is obvious that with the sleeve 200 and its associated parts stationary while the sample cup 220 and its associated parts including the piston 216 are rotated under the influence of the motor M2 measured quantities of the fluid under pressure within the conduit 114 will be delivered to the receptacle 164 in a manner similar to that described in connection with the form of the invention shown in FIG. 2.

The invention is not to be limited to the exact arrangement of parts shown in the accompanying drawings or described in the specification as various changes in the details of construction may be resorted to without departing from the spirit or scope of the invention. For example, whereas the present fluid sampling device has been described in connection with an electric motor M, the drive shaft 80 of which has been described as being continuously rotatable in one direction, the device will function for the purposes intended whether the delivery tube 50 be continuously rotated or whether it be caused to oscillate through an angle of 90° or more. In such an instance, oscillation of the delivery tube 50 may be accomplished either by the use of a reversible type motor or by interposing a suitable reversing drive mechanism between the motor drive shaft and the delivery tube. Therefore, only insofar as the invention has been particularly pointed out in the accompanying claims is the same to be limited.

Having thus described the invention what I claim as new and desire to secure by Letters Patent is:

1. A fluid sampling device adapted to withdraw measured samples of fluid under pressure from a flow line and deliver the same exteriorly of the flow line and comprising a sleeve member projecting into said flow line, said sleeve member being provided with a pair of diametrically opposed radial ports, a hollow delivery tube through which samples of fluid are adapted to be expelled from the flow line, said delivery tube being fixedly connected to said sleeve member, a cylindrical cup member fitting within said sleeve member in coaxial relationship, means for rotating one of said members, means fixedly securing the other member against rotation, said cup member being provided with a pair of diametrically opposed radial ports which are movable into register with the radial ports in the sleeve member during each 180° relative rotation between the two members, said sleeve member being provided with a longitudinally extending port for establishing communication between the delivery tube and the interior of the sleeve member, said cup member being provided with an end wall having a cooperating longitudinally extending port designed for register with the longitudinally extending port in the sleeve member and, when in such register, establishing communication between the interior of the cup member and the delivery tube, said longitudinally extending ports being designed for register with each other during each 360° relative rotation between the members and at a time when the radial ports in the sleeve member and cup member are out of register, a cylindrical piston reciprocable in said cup member and movable toward and away from said end wall for expelling fluid samples through said longitudinally extending ports to the delivery tube, the end of the piston remote from said end wall being exposed to fluid pressure in said flow line, interengaging cam means on the sleeve member and piston for effecting retraction of the piston during rotation of said one member, and at such time as said longitudinally extending ports are in register, and a plug valve on the other end of said piston, said plug valve being adapted for sealing engagement with said longitudinally extending port in the end wall of said cup member when the piston is in its fully retracted position.

2. A fluid sampling device adapted to withdraw measured samples of fluid under pressure from a flow line and deliver the same exteriorly of the flow line and comprising an outer cup member having a cylindrical side wall and an end wall, said cup member being adapted to be interposed in said flow line with its longitudinal axis extending transversely of the flow line, a hollow delivery tube through which samples of fluid are adapted to be expelled from the flow line, means fixedly connecting said delivery tube to the outer cup member, an inner cup member fitting telescopically within said outer cup member and having a cylindrical side wall and an end wall, means yieldingly urging said inner cup member axially of the outer cup member in a direction to cause the end wall of the inner cup member to seat against the end wall of the outer cup member, means establishing relative rotation between said cup members, the cylindrical walls of said cup members being provided with respective pairs of diametrically disposed radial ports which are movable into register with each other during each 180° relative rotation between the cup members, the end walls of said cup members being provided with respective eccentric ports operable when in register with each other to establish communication between the interior of the inner cup member and said delivery tube, said eccentric ports being designed for register with each other during each 360° relative rotation between the cup members and at a time when the radial ports in the cylindrical walls of the cup members are out of register, a cylindrical piston reciprocable in said inner cup member for expelling fluid samples through said eccentric ports to the delivery tube, the end of the piston remote from the end wall of the inner cup member being exposed to fluid pressure in said flow line, interengaging cam means on the outer cup member and the piston for effecting retraction of the piston during such time as the eccentric ports are in register with each other, and a plug valve on said piston and projecting from the end wall thereof which opposes the end wall of the inner member, said plug valve being designed for entry into the eccentric port in the end wall of the inner cup when the piston is in its fully retracted position.

3. A fluid sampling device adapted to withdraw measured samples of fluid under pressure from a flow line and deliver the same exteriorly of the flow line and comprising an outer cup member having a cylindrical side wall and an end wall, said cup member being adapted to be interposed in said flow line with its longitudinal axis extending transversely of the flow line, a hollow delivery tube through which samples of fluid are adapted to be expelled from the flow line, means fixedly connecting said delivery tube to the outer cup member, an inner cup member fitting telescopically within said outer cup member and having a cylindrical side wall and an end wall, one of said walls being formed of polytetrafluorethylene, means yieldingly urging said inner cup member axially of the outer cup member in a direction to cause the end wall of the inner cup member to seat against the end wall of the outer cup member, means establishing relative rotation between said cup members, the cylindrical walls of said cup members being provided with respective pairs of diametrically disposed radial ports which are movable into register with each other during each 180° relative rotation between the cup members, the end walls of said cup members being provided with respective eccentric ports operable when in register with each other to establish communication between the interior of the inner cup member and said delivery tube, said eccentric ports being designed for register with each other during each 360° relative rotation between the cup members and at a time when the radial ports in the cylindrical walls of the cup members are out of register, a cylindrical piston reciprocable in said inner cup member for expelling fluid samples through said eccentric ports to the delivery tube, said polytetrafluorethylene end wall being formed with an integral raised sealing annulus surrounding the eccentric port in said wall, said sealing annulus having running engagement with the adjacent end wall, the end of the piston remote from the polytetrafluorethylene end wall being exposed to fluid pressure in said flow line, the end of the piston adjacent to said polytetrafluorethylene end wall being provided with a plug valve thereon for sealing the eccentric port in the adjacent end wall when the piston is in its advanced position, and interengaging cam means on the outer cup member and the piston for effecting retraction of the piston during relative rotation between said cup members.

References Cited by the Examiner

UNITED STATES PATENTS 2,291,243    7/1942    Levy _____ 92—165 X
3,031,890    5/1962    Struck _____ 73—422

RICHARD C. QUEISSER, *Primary Examiner.*

JOSEPH P. STRIZAK, *Examiner.*